Oct. 27, 1942.    W. B. HULLHORST    2,300,288
TORQUE MEASURING MACHINE
Filed April 20, 1940    2 Sheets-Sheet 1

Wm B. Hullhorst
INVENTOR

BY Rule & Hoge
ATTORNEYS

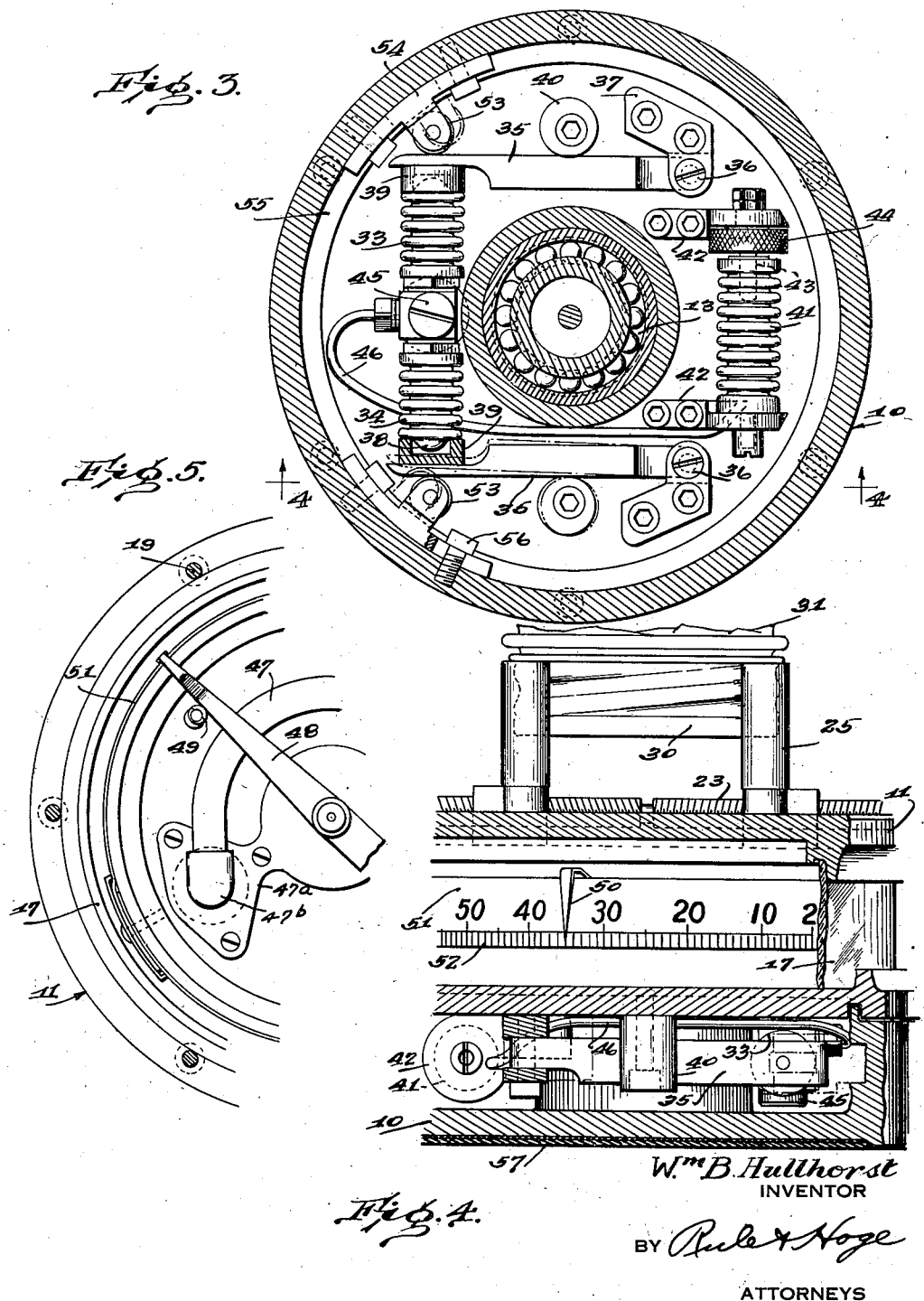

Patented Oct. 27, 1942

2,300,288

UNITED STATES PATENT OFFICE 2,300,288

TORQUE MEASURING MACHINE

William B. Hullhorst, Toledo, Ohio, assignor to Owens-Illinois Glass Company, a corporation of Ohio Application April 20, 1940, Serial No. 330,736

7 Claims. (Cl. 265—25)

My invention relates to machines adapted for measuring torque. In the form herein disclosed it is particularly adapted for measuring the torque required to tighten or loosen screw-type or bayonet closures or caps on bottles, jars and other containers made of glass or other material. The invention may be also used to measure torque in twisting machines for closures, check weights of torsion springs, measure friction in screw devices, and for various other purposes.

An object of the invention is to provide a simple and practical machine of the character indicated which is accurate, reliable and effective in operation, and in which the accuracy is not materially affected by temperature changes, shock torques, alien stresses on the rotating member, or position of the instrument.

Other objects of the invention will appear hereinafter.

Referring to the accompanying drawings:

Fig. 3 is a section as indicated by the line 3—3 on Fig. 2, looking in an upward direction;

Fig. 4 is a section at the line 4—4 on Fig. 3 but looking at the machine in upright position; and Fig. 5 is a fragmentary plan view with the top plate removed.

Figure 1:
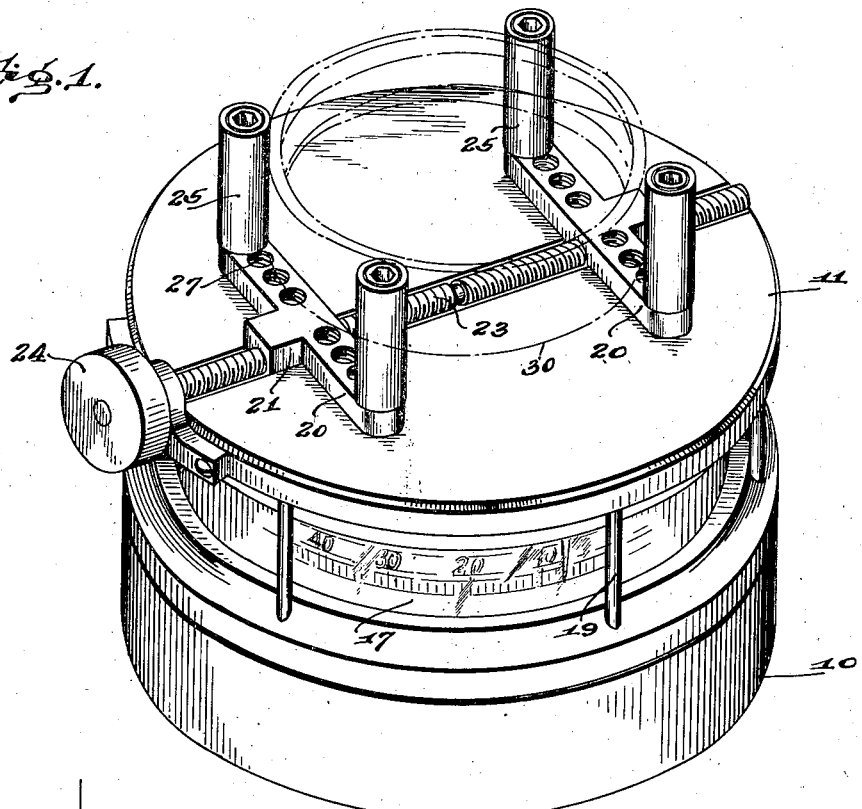
Fig. 1 is a perspective view of a torque machine or implement embodying the principles of my invention.

The machine comprises a lower member or base 10 and an upper member 11 mounted for rotation relative to the base and comprising a gauge case or closure within which is mounted a pressure gauge 12. The rotating member 11 is supported on roll and thrust bearings 13. The rotating member comprises a floor 14, a cylindrical side wall 15 and a plate 16 seated on the wall 15 and forming a cover for the chamber or case in which the pressure gauge 12 is supported. Surrounding the wall 15 and spaced outwardly therefrom is a cylindrical glass wall 17 or window which is clamped in position between the floor plate 14 and a top plate 18. Clamping bolts 19 secure the plates together.

Figure 2:
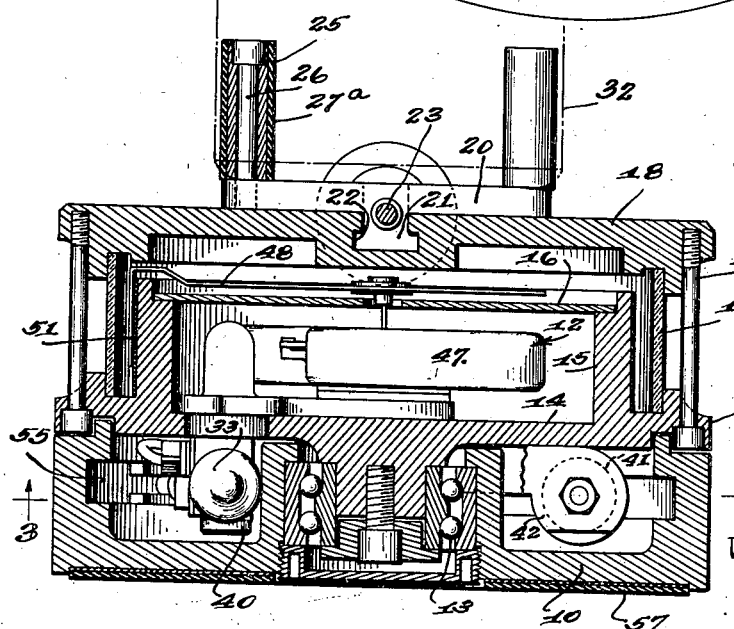
Fig. 2 is a central sectional elevation of the machine.

Mounted on the top plate 18 is a work-holding device comprising a pair of parallel clamping bars 20, each formed with an integral slide block 21 slidable in an under-cut guideway or groove 22 formed in the plate 18 and extending diametrically across the plate. An adjusting rod 23 is formed with right and left-hand screw threads to engage corresponding threads in openings extending through the slide bars. The rod 23 is mounted for rotation on the plate 18, being rotatable by a hand wheel 24 for moving the clamping bars toward and from each other. Clamping posts 25 are mounted on the bars 20. Each said post comprises a pin or bolt 26 threaded into one of a series of screw-threaded openings 27 formed in the clamping bar. The post is provided with an outer sleeve or cover 27a of rubber or the like. The posts may be attached in any of the openings 27, permitting adjustment for holding ware of various sizes throughout a wide range. As indicated in Fig. 4, the clamping posts are shown holding a screw cap 30 on an inverted jar or container 31. Fig. 2 shows in broken lines a bottle or container 32 in upright position held by the clamping posts.

The pressure gauge is actuated by hydraulic pressure supplied through a pair of metal bellows 33 and 34 extending horizontally in line with each other and housed within the lower member 10. These bellows are supported between a pair of arms 35, each of which is connected by a pivot 36 to a bracket 37 bolted to the under surface of the floor 14. The outer end of each bellows is provided with a boss 38 which seats in a recess formed in a head 39 on the free end of an arm 35, thus supporting the bellows. The arms 35 are held in clamping engagement with the bellows by means of posts 40 depending from the floor 14 and eccentrically mounted for adjustment toward and from said arms.

A third bellows 41 is mounted on a pair of brackets 42 attached to the floor plate 14. The support for the bellows 41 includes a screw rod 43 mounted in one of the brackets. A thumb nut 44 on the rod 43 is adjustable thereon to adjustably apply pressure to the bellows for adjusting the indicator pointer presently to be described. A screw cap 45 is removable to permit the bellows to be filled with a suitable liquid. A pipe 46 connects the bellows 33, 34 to the bellows 41 for conducting liquid to the latter and for equalizing the pressure between the bellows. The pressure gauge comprises a tubular member 47 in the form of an incomplete ring mounted on a plate 47a secured to the floor 14. The tube 47 is in communication with the bellows through a connecting elbow 47b and is expansible under hydraulic pressure. The gauge includes an indicator comprising a horizontal arm 48 pivoted centrally within the casing and operatively connected to the member 47 through conventional speed multiplying gearing including a rack and pinion (not shown). A stop 49 limits the return movement of the indicator when pressure in the gauge is discontinued. The arm 48 is provided with a pointer 50 which extends downward over a scale 51 behind the glass 17. Scale markings 52 are provided to indicate pressures, the scale being calibrated in inch pounds, millimeter grams, or in accordance with any other desired system of measurement.

Rolls 53 (Fig. 3) are arranged to engage the free ends of the arms 35 for transmitting pressure to the gauge. Said rolls are carried in brackets 54 mounted in an annular groove 55 formed in the inner face of the cylindrical wall of the lower member 10. Said brackets are adjustable lengthwise of the groove and are clamped in adjusted position by bolts 56.

The lower member 10 may be secured by bolts or otherwise to any suitable base or support or, as shown, it may be provided with rubber or other friction material 57 on its under surface to prevent rotation.

In operation the work-piece, as, for example, the cap 30 (Fig. 4) is positioned between the clamping posts and the latter brought into gripping position by turning the hand wheel 24. Rotative force then applied to the work-piece causes a limited rotation of the upper member 11 relative to the stationary member 10. This causes one of the rolls 53 (Fig. 3) to swing one of the arms 35, depending on the direction of rotation, inwardly about its pivot 36 to the dotted line position indicated in Fig. 3, thereby applying pressure to the bellows 34. The opposite arm 35 is prevented from moving outwardly to relieve the pressure, being held in position by the post 40. The pressure is transmitted from the bellows to the indicator in a conventional manner, causing the pointer to travel along the scale to a position determined by the degree of torque applied, such degree being indicated on the scale 52. The volume of the hydraulic system may be varied to suit the volume of the fluid it contains by the adjusting means 44. Such adjustment of the volume also varies the pressure. Hence the initial pressure may be adjusted to establish a constant which may be used as a zero in calibration under varying temperature changes.

Modifications may be resorted to within the spirit and scope of my invention.

I claim:

1. A torque measuring apparatus comprising a relatively stationary member forming a base, a rotatable hollow cylindrical member mounted thereon with its axis vertical and rotatable relative to said base about said axis, means on said rotatable member for gripping a work-piece, a hydraulic pressure gauge housed in said rotatable member, hydraulic bellows housed within said stationary member and hydraulically connected to said gauge, and means for transmitting to said bellows rotative force applied to said rotatable member, said gauge including means responsive to the hydraulic pressure within said bellows to indicate the degree of said rotative force.

2. A torque meter comprising concentric, cylindrical, hollow members relatively rotatable about a common axis, a gripping device carried by one of said members for gripping a work-piece, a hydraulic pressure gauge housed within one of said members, hydraulic bellows housed in the other said member and hydraulically connected with said gauge, and means for transmitting to said bellows rotative force applied to one of said members, said gripping means comprising a screw-threaded rod mounted on one of said members and extending diametrically thereacross, a pair of clamping bars threaded on said rod and movable toward and from each other by rotation of the rod, and clamping posts mounted on said bars.

3. A torque measuring apparatus comprising a hollow cylindrical base member, a rotatable member mounted on said base for rotation about a vertical axis, hydraulic bellows housed in said base, a pair of arms mounted for swinging movement on the lower side of said rotatable member, said arms arranged to engage the ends of said bellows and support the latter, means whereby rotative movement of the rotatable member relative to said base swings one of said arms and thereby applies to the bellows a pressure corresponding to the rotative force applied to the rotatable member, and indicating means actuated by said bellows to indicate the degree of said rotative force.

4. A torque measuring apparatus comprising a relatively stationary member forming a base, a rotatable member mounted thereon for rotation relative thereto about a vertical axis, means on said rotatable member for gripping a work-piece, a hydraulic pressure gauge, hydraulic bellows housed within said stationary member and hydraulically connected to said gauge, means for transmitting to said bellows rotative force applied to said rotatable member, said gauge including means responsive to the hydraulic pressure within said bellows to indicate the degree of said rotative force, a supplemental bellows hydraulically connected to said first mentioned bellows, and manual adjusting means for applying pressure to said supplemental bellows and thereby adjusting the initial pressure in the hydraulic system.

5. A torque measuring apparatus comprising in combination a cylindrical base member, a cylindrical rotary member mounted on the base member concentrically therewith for rotation about a vertical axis, said rotary member comprising a cylindrical side wall of transparent material, work-gripping means mounted on the rotary member, a hydraulic bellows and a hydraulic pressure gauge hydraulically connected and mounted within said members respectively, and means for transmitting to said bellows and gauge rotative force applied to said rotary member, said gauge comprising indicating means including a pointer rotatable about said axis and a scale extending along the interior of said transparent wall.

6. A torque meter comprising concentric, cylindrical, hollow members relatively rotatable about a common axis, a gripping device carried by one of said members for gripping a work-piece, said gripping device including gripping members symmetrically arranged on opposite sides of said axis for holding the work-piece concentric with said axis, a hydraulic pressure gauge housed within one of said members, hydraulic bellows housed in the other said member and hydraulically connected with said gauge, and means for transmitting to said bellows rotative force applied to one said member and causing said force to be transmitted through the bellows to the other said member.

7. A torque measuring apparatus comprising members relatively rotatable about an axis, a pair of arms carried by one of said members on opposite sides of said axis, each arm being pivotally connected at one end to its carrying member, hydraulic bellows supported by said arms, said bellows being held at its ends by the free ends of said arms, rolls carried by the other said member in position to engage the free ends of said arms and apply pressure therethrough to the bellows when said members are relatively rotated in either direction, a hydraulic pressure gauge hydraulically connected to said bellows, and torque indicating means actuated by the gauge.

WILLIAM B. HULLHORST.